United States Patent
Singh et al.

(10) Patent No.: US 9,634,927 B1
(45) Date of Patent: Apr. 25, 2017

(54) POST-ROUTED VLAN FLOODING

(71) Applicant: Cisco Technology, Inc., San Jose, CA (US)

(72) Inventors: Hardeep Singh, Fremont, CA (US); Srinivasan Ramabadran, Sunnyvale, CA (US); Raghava Sivaramu, Sunnyvale, CA (US); Mahesh Mariappa Krishnappa, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 76 days.

(21) Appl. No.: 14/657,093

(22) Filed: Mar. 13, 2015

(51) Int. Cl.
*H04L 12/28* (2006.01)
*H04L 12/721* (2013.01)
*H04L 12/713* (2013.01)

(52) U.S. Cl.
CPC ............ *H04L 45/32* (2013.01); *H04L 45/586* (2013.01)

(58) Field of Classification Search
CPC ..... H04L 45/74; H04L 29/0653; H04L 12/56; H04L 49/256; H04L 2012/5621; H04L 2012/5624; H04L 45/54; H04L 45/745; H04L 12/4608; H04L 29/06612; H04L 12/5689

See application file for complete search history.

(56) References Cited

U.S. PATENT DOCUMENTS

| | | | |
|---|---|---|---|
| 5,959,990 A | 9/1999 | Frantz et al. | |
| 6,094,435 A * | 7/2000 | Hoffman | H04L 12/5693 370/414 |
| 7,940,766 B2 | 5/2011 | Olakangil et al. | |
| 2002/0051450 A1* | 5/2002 | Ganesh | H04L 49/103 370/389 |
| 2003/0174725 A1* | 9/2003 | Shankar | H04L 12/4645 370/428 |
| 2005/0138206 A1* | 6/2005 | Moreels | H04L 12/462 709/245 |
| 2011/0202675 A1 | 8/2011 | Faulk, Jr. | |
| 2012/0020373 A1* | 1/2012 | Subramanian | H04L 45/58 370/419 |
| 2012/0033670 A1 | 2/2012 | Olakangil | |
| 2014/0328343 A1 | 11/2014 | Kapadia et al. | |
| 2015/0280928 A1* | 10/2015 | Tessmer | H04L 12/4641 370/390 |

* cited by examiner

*Primary Examiner* — Mohamed Kamara
(74) *Attorney, Agent, or Firm* — Edell, Shapiro & Finnan, LLC

(57) ABSTRACT

A hierarchical lookup forwarding model to induce a Layer (L2) forwarding look up in a post-routed virtual local area network (VLAN). In one example, a line card of a networking device receives a packet for routing from a first virtual local VLAN to a second VLAN. The line card determines that the packet is associated with a host route having a corresponding incomplete Layer 3 (L3) adjacency. The line card steers the packet to a fabric module of the networking device. The fabric module performs an L2 lookup on the packet and floods the packet to one or more of line cards of the networking devices. The one or more line cards flood the packet on a plurality of external ports of the networking device.

20 Claims, 4 Drawing Sheets

POST-ROUTED VLAN FLOODING

TECHNICAL FIELD

The present disclosure relates to packet processing in a network device.

BACKGROUND

A virtual local area network (VLAN) is a logical broadcast domain that can span multiple physical local area network (LAN) segments. VLANs have the same attributes as a physical LAN, but allow the grouping of host devices even if they are not located on the same physical LAN segment. For example, all host devices (e.g., computers, workstations, servers, printers, etc.) used by a particular workgroup can be connected to the same VLAN, regardless of their physical connections to the network or the fact that they might be intermingled with other workgroups. VLANs enable reconfiguration of a network through software, rather than by physically unplugging and moving devices or other hardware.

VLANs are usually associated with Internet Protocol (IP) subnetworks. For example, all of the host devices in a particular IP subnetwork may belong to the same VLAN.

DESCRIPTION OF EXAMPLE EMBODIMENTS

Overview

Presented herein are techniques that use a hierarchical lookup forwarding model to induce a Layer (L2) forwarding look up in a post-routed virtual local area network (VLAN). In one example, a line card of a networking device receives a packet for routing from a first virtual local VLAN to a second VLAN. The line card determines that the packet is associated with a host route having a corresponding incomplete Layer 3 (L3) adjacency. The line card steers the packet to a fabric module of the networking device. The fabric module performs an L2 lookup on the packet and floods the packet to one or more line cards of the networking device. The one or more line cards flood the packet on a plurality of external ports of the networking device.

Example Embodiments

Figure 1:
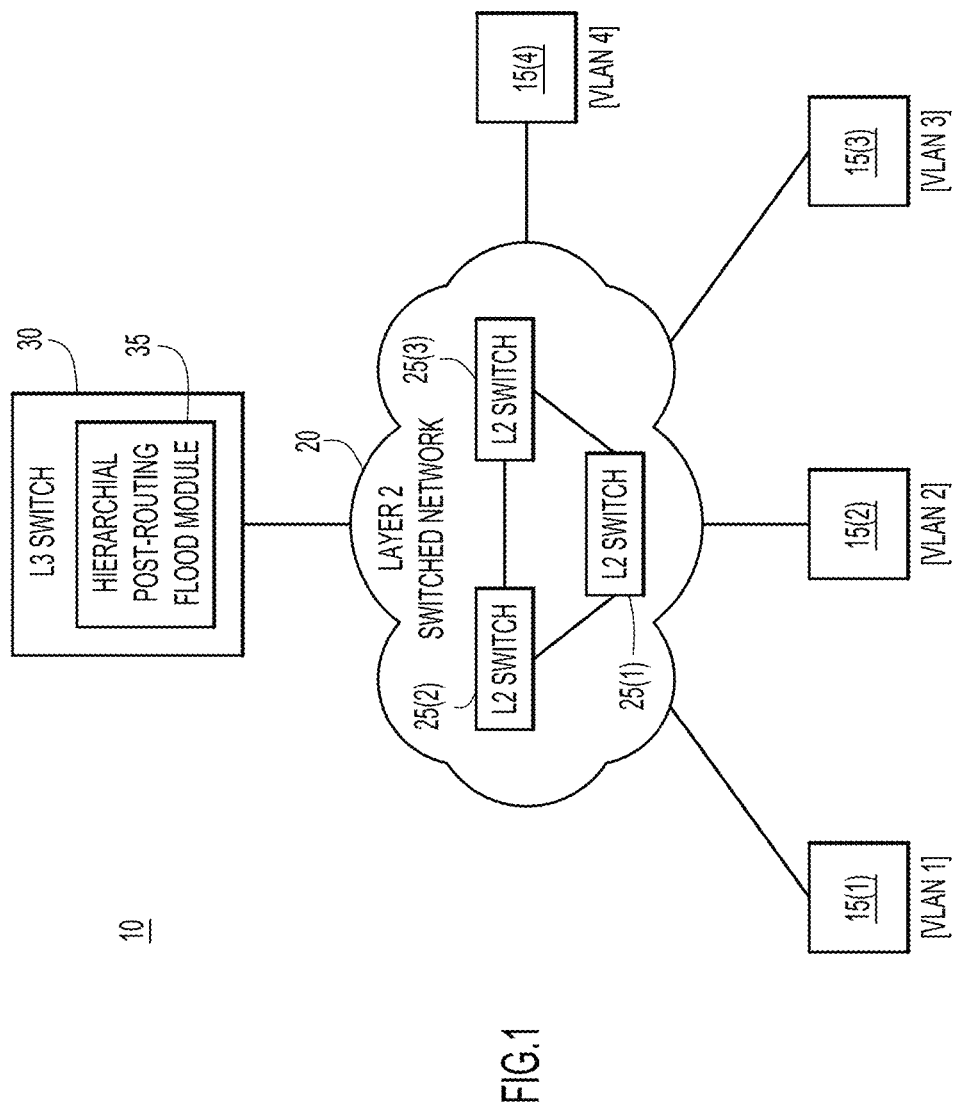
FIG. 1 is a block diagram of an example computer network having networking devices configured to execute the hierarchical post-routing flood techniques presented herein, according to an example embodiment.

FIG. 1 is a block diagram of a computer network 10 in which the hierarchical post-routing flood techniques presented herein may be implemented. As shown, network 10 comprises a plurality of host devices 15(1)-15(4), a switched network 20 comprised of a plurality of networking devices (e.g., switches) 25(1)-25(3), and another networking device 30 (e.g., switch) connected to the switched network. In the example of FIG. 1, the switched network 20 operates at Layer 2 (L2) of the Open Systems Interconnection model (OSI) model. As such, the networking devices 25(1)-25(3) within switched network 20 are sometimes referred to herein as L2 switches and the switched network 20 is sometimes referred to herein as an L2 switched network. The networking device 30 is configured to perform routing in accordance with Layer (L3) of the OSI model and, as such, is sometimes referred to herein as L3 switch 30.

The host devices 15(1)-15(4) may comprise, for example, computers/workstations, servers, printers, etc. The host devices 15(1), 15(2), 15(3), and 15(4) are each assigned to a specific virtual local area network (VLAN). In the example of FIG. 1, host devices 15(1) and 15(4) are members of "VLAN 1," host device 15(2) is a member of "VLAN 2," and host device 15(3) is a member of "VLAN 3." It is to be appreciated that the specific numbers of host devices, L2 switches, VLANs, etc. shown in FIG. 1 are merely illustrative and that the hierarchical post-routing flood techniques presented herein may be implemented in computer networks having other arrangements. It is also to be appreciated that the computer network 10 may be part of a larger computer network (e.g., multiple L3 switches, larger L2 switched network, etc.) that is configured to implement the hierarchical post-routing flood techniques presented herein.

In general, VLANs divide broadcast domains in different LAN environments. Communications that occur within the same VLAN (i.e., intra-VLAN communications) operate at L2 of the OSI model. For example, host device 15(1) can communicate with host device 15(4) by sending the intra-VLAN packets to a specific switch port based on the destination Media Access Control (MAC) address. In contrast, communications that span (cross between) different VLANs (i.e., inter-VLAN communications) operate at L3 of the OSI model. That is, packets sent by host device 15(1) to, for example, host device 15(2) passes from VLAN 1 to VLAN 2 (different VLANs). Packets sent between different VLANs are subjected to inter-VLAN routing operations and, as such, are sometimes referred to herein as "inter-VLAN packets" or "routed packets." In accordance with L3 routing, routed packets are sent to a specific next-hop IP address, based on the destination IP address.

Certain conventional networking devices have line cards that only support a L2-to-L3 lookup sequence or pipeline. That is, these conventional line cards are only capable of performing one L2 table lookup ("L2 lookup") to identify MAC addresses for bridging (intra-VLAN communications) that is followed by one L3 table lookup ("L3 lookup") to identify IP addresses for routing (inter-VLAN communications). This means that for inter-VLAN communications, such line cards are unable to perform additional L2 lookups for post-routed VLAN packets to identify the exit port/outgoing interface for the routed packet. Stated differently, these conventional line cards are incapable of performing a subsequent L2 lookup in the pipeline post-routing such that an L2-to-L3-to-L2 lookup sequence/pipeline is condensed to an L2-to-L3 lookup sequence, with the routing result providing port/VLAN and MAC rewrite. As a result of this limitation, Layer 3 traffic is not forwarded unless the next-hop's adjacency is fully resolved, meaning the destination MAC, VLAN and outgoing interface/exit port must all be known in order forward the routed packet.

There are certain functions/deployments that require an L2-to-L3-to-L2 lookup sequence for post-routing flooding due to an unresolved (i.e., partial) next-hop adjacency. As such, these deployments will not operate with networking devices having line cards that support only an L2-to-L3 lookup sequence. For example, conventional networking devices having line cards that support only an L2-to-L3 lookup sequence are unable to support network load balancer (NLB) deployments due to the absence of the L2 flood capability for post-routed traffic.

Presented herein are hierarchical post-routing flood techniques that address the inability of certain line cards to perform the L2-to-L3-to-L2 lookup sequence. The hierarchical post-routing flood techniques presented herein distribute the L2-to-L3-to-L2 lookup sequence across both a line card and a fabric module in order to enable a flood of post-routed packets associated with an unresolved/incomplete adjacency.

Figure 2:
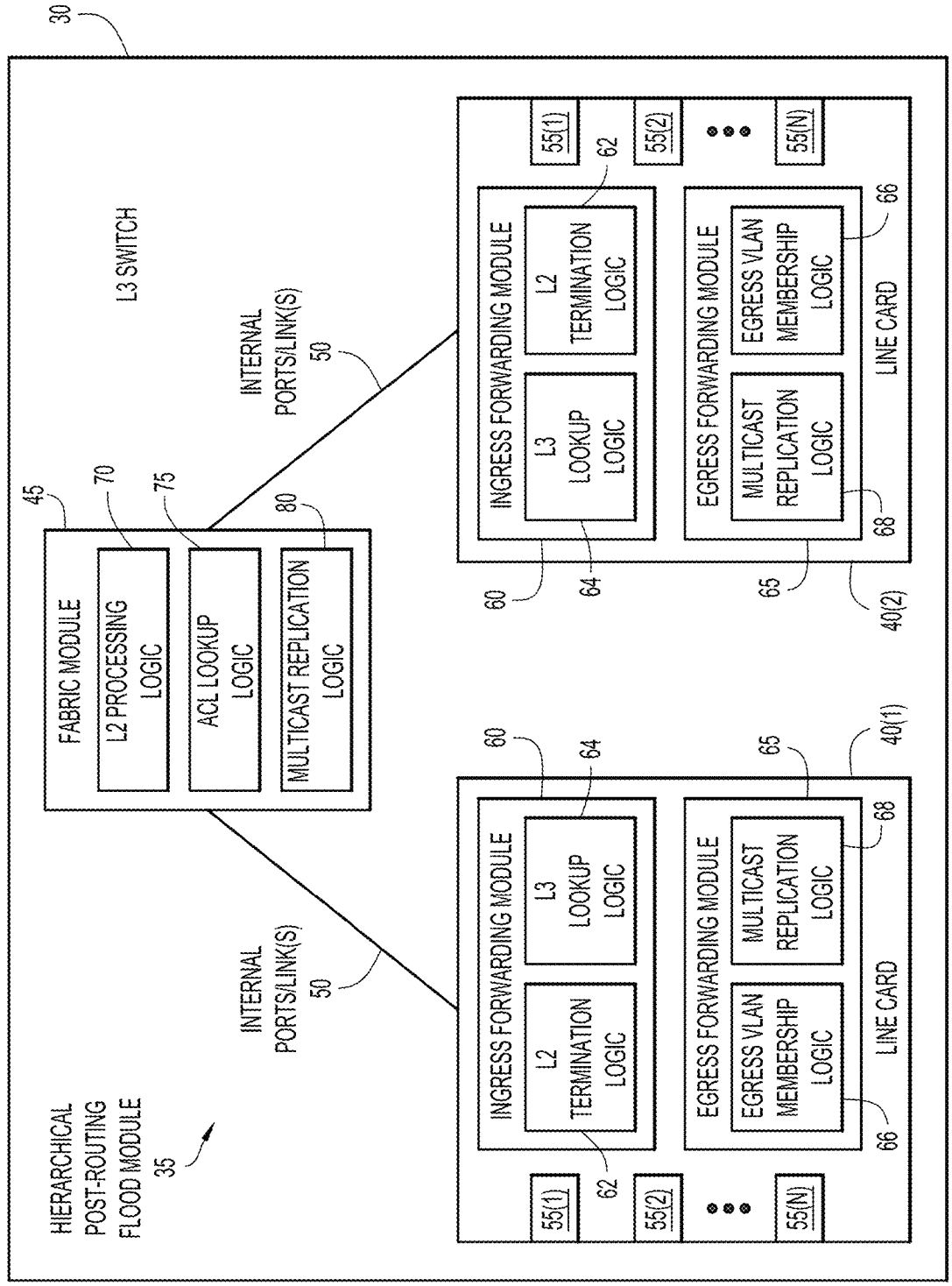
FIG. 2 is a block diagram of a networking device configured to execute the hierarchical post-routing flood techniques, according to an example embodiment.

In accordance with the example of FIG. 1, the L3 switch 30 performs inter-VLAN routing functions. As such, the L3 switch 30 includes a hierarchical post-routing flood module 35 that executes the hierarchical post-routing flood techniques presented herein. FIG. 2 is a block diagram illustrating further details of the L3 switch 30 and the hierarchical post-routing flood module 35.

As shown in FIG. 2, the L3 switch 30 includes a first line card 40(1) and a second line card 40(2). In this example, the line cards 40(1) and 40(2) each include an ingress forwarding module 60 and an egress forwarding module 65 that may be embodied as one or more application specific integrated circuits (ASICs). The ingress forwarding modules 60 include, among other elements, L2 termination logic 62 and L3 lookup logic 64. The egress forwarding modules 65 include egress VLAN membership logic 66 and multicast replication logic 68. The line cards 40(1) and 40(2) each include a plurality of external ports 55(1)-55(N).

FIG. 2 also illustrates that the L3 switch 30 comprises a fabric module 45 that is formed as one or more ASICs. The fabric module 45 includes L2 processing logic 70, access control list (ACL) logic 75, and multicast replication logic 80.

In general, the L2 termination logic 62, L3 lookup logic 64, egress VLAN membership logic 66, multicast replication logic 68, L2 processing logic 70, access control list (ACL) logic 75, and multicast replication logic 80 are hardware logic elements that perform various operations described further below. However, these various hardware elements may include or operate with software elements for programming, control, etc.

As shown, the fabric module 45 is connected to each of the line cards 40(1) and 40(2) via one or more internal ports/links. The internal link(s) between the fabric module 45 and line cards 40(1)/40(2) are represented in FIG. 2 by lines 50.

The hierarchical post-routing flood techniques are implemented by the line cards 40(1) and 40(2) in combination with the fabric module 45. As such, the hierarchical post-routing flood module 35 is represented as spanning across the line cards 40(1) and 40(2) and the fabric module 45 (i.e., the line cards 40(1)/40(2) and the fabric module 45 form the hierarchical post-routing flood module 35 of FIG. 1).

In accordance with examples presented herein, host routes (i.e., routes for host devices 15(1)-15(4)) are installed/stored in hardware of the line cards 40(1) and 40(2). The host routes are stored with the L2 information for the next hop (i.e., next hop destination MAC and VLAN) and point to a L3 adjacency. In general, L3 information is represented by an IP route (IP address) and an IP adjacency (i.e. information that dictates how packets should exit from the device). In accordance with the examples presented herein, certain adjacencies are unresolved/incomplete (i.e., the destination MAC and VLAN are known, but the exact exit port/ outgoing interface is unknown). As such, certain host routes are installed/store in the hardware using the known information (e.g., destination MAC and VLAN) and will point to an incomplete adjacency that has no associated exit port (i.e., those host routes may be associated with incomplete adjacencies).

Adjacencies that do not have an outgoing interface binding (i.e., a known exit port) are programmed with a fabric module identifier (ID) as part of the adjacency. That is, the exit port field in an installed adjacency is replaced by the fabric module ID. An adjacency in which the fabric module ID is added in place of the exit port is referred to herein as a "steering adjacency" because packets associated with such an adjacency will be steered (i.e., re-directed) to the fabric module 45. That is, when a line card 40(1) or 40(2) receives a routed packet (inter-VLAN packet) directed along a host route pointing to an associated steering adjacency, the line card 40(1) or 40(2) will steer the packet to the fabric module 40. The packet is steered to the fabric module 45 after an L2-to-L3 lookup sequence performed at the L2 termination logic 62 and L3 lookup logic 64 of the ingress forwarding module 60. In certain examples, a packet sent from a line card 40(1) or 40(2) to the fabric module 45 as a result of an associated steering adjacency is referred to as a "fabric redirected packet."

The fabric module 45 may be configured to act as a strict transit mechanism (i.e., pass packets between line cards without processing the packets and/or modifying the packet header) or the fabric module 45 may be configured to perform processing operations on the packets. In the examples presented herein, the fabric module 45 is configured to perform packet processing on a received fabric redirected packet.

In order to ensure that the fabric module 45 processes a received fabric redirected packet, the header of the received fabric redirected packet includes a "hierarchical lookup identifier (ID)." The hierarchical lookup ID operates as a notification mechanism that informs the fabric module 45 that the received fabric redirected packet should be processed, rather than merely passed therethrough. Therefore, upon receipt of a packet that includes a hierarchical lookup ID, the fabric module 45 determines that the received packet is a fabric redirected packet. The fabric module 45 may then initiate packet processing of the received fabric redirected packet.

An element of the packet processing performed at the fabric module 45 is an L2 lookup device on the packet properties by L2 processing logic 70. In other words, the fabric module 45 takes the destination MAC of the Ethernet (L2 header) of the packet and performs a lookup operation. In accordance with the examples presented herein, the fabric module 45 is configured such that it is guaranteed that the fabric module 45 will not find the destination MAC address associated with the received fabric redirected packet in the L2 forwarding table/database of the fabric module hardware. That is, the L2 lookup at the fabric module 45 is performed so as to result in a table "miss" for the MAC address associated with the received fabric redirected packet.

The fabric module 45 may be configured to ensure/ guarantee that the L2 lookup at the fabric module fails to find the destination MAC address (i.e., guaranteed table miss) by first ensuring that the particular MAC address is never learned on the fabric module. More specifically, the fabric module 45 is programmed so as to disable MAC learning for a particular VLAN or a plurality of VLANs. Disabling the MAC learning feature for one or more VLANs results in an empty table, at least for the particular VLAN(s).

This ensures that there will always be a miss with the L2 lookup at the fabric module 45.

Due to the fact that the destination MAC address associated with the fabric redirected packet is not located during the L2 lookup, the multicast replication logic 80 of the fabric module 45 replicates the fabric redirected packet and initiates a flood of the replicated packet on internal links 50. More specifically, the destination lookup failure condition (i.e., failure to find the destination MAC address) will be detected as part of an ACL lookup of the ACL lookup logic 75, which initiates replication by directing the packet to a pre-programmed IP multicast group (IPMG) that performs internal replication (i.e., ACL detects condition to initiate flood). The packets flooded by fabric module 45 on the IPMG are sometimes referred to herein as "internal flood packets" since these packets are sent on the internal links 50 to all of the line cards 40(1) and 40(2).

The IPMG is programmed on both the fabric module 45 and the line cards 40(1)/40(2). The multicast replication logic 68 at line cards 40(1)/40(2) are configured to replicate the internal flood packets onto external ports 55(1)-55(N) associated with the IPMG. The packets flooded by the line cards 40(1)/40(2) are sometimes referred to herein as "external flood packets" since these packets are sent on the external links associated with the external ports 55(1)-55(N).

In operation, multiple IPMGs exist in a networking device, such as L3 switch 30. As such, the headers of the internal flood packets include an IPMG index value which identifies the IPMG that was used by the fabric module 45 to send the internal flood packets. Upon receipt of an internal flood packet, the line cards 40(1)/40(2) use the index value in the header to identify the IPMG for use in sending the external flood packets. The line cards 40(1)/40(2) then send external flood packets on one or more external ports 55(1)-55(N) associated with the IPMG.

In accordance with certain examples presented herein, the egress VLAN membership logic 66 at line cards 40(1)/40(2) performs an egress VLAN membership check to prune/limit flood packets to only the post-routed VLAN external ports. That is, external flood packets are associated with a specific VLAN (e.g., VLAN 2). The egress VLAN membership logic 66 may, before sending external flood packets at the external ports 55(1)-55(N), perform a check in hardware to see if the port is part of the specific VLAN. If an external port is part of the specific VLAN, then the external port is used to send an external flood packet out. However, if an external port is not part of the specific VLAN, then the external port is not used to send out an external flood packet (e.g., the external flood packet associated with the port is dropped).

As noted above, in accordance with the techniques presented herein, a packet is received at a line card 40(1)/40(2) which performs an L3 lookup (i.e., a routing lookup) on the packet. The packet enters on a first VLAN (e.g., VLAN 1) and is routed (moved) to a second VLAN (e.g., VLAN 2) using an L3 construct (IP address). When routing occurs, certain primitives need to be applied. In accordance with the examples presented herein, even though the lookup performed at the fabric module 45 is an L2 lookup, the multicast replication logic 80 on the fabric module 45 forces the L3 metadata in the post-routed flood traffic so that L3 features (e.g., routed egress ACLs) can still be applied to flood copies.

In operation, the execution of such L3 primitives is ensured by marking internal flood packets to indicate that those packets are routed traffic. The internal flood packets are marked as routed packets by adding a "routed marker" to the header of the internal flood packets (e.g., set a flag to indicate that the internal flood packets moved form the first to second VLAN). Therefore, when a line card 40(1)/40(2) receives a packet on an internal link 50, the line card will determine if the packet includes the routed marker in the header. Upon detection of a routed marker in the header the line card 40(1)/40(2) can initial application of all regular L3 constructs that would be applied to packets routed from the first to second VLAN.

Figure 3:
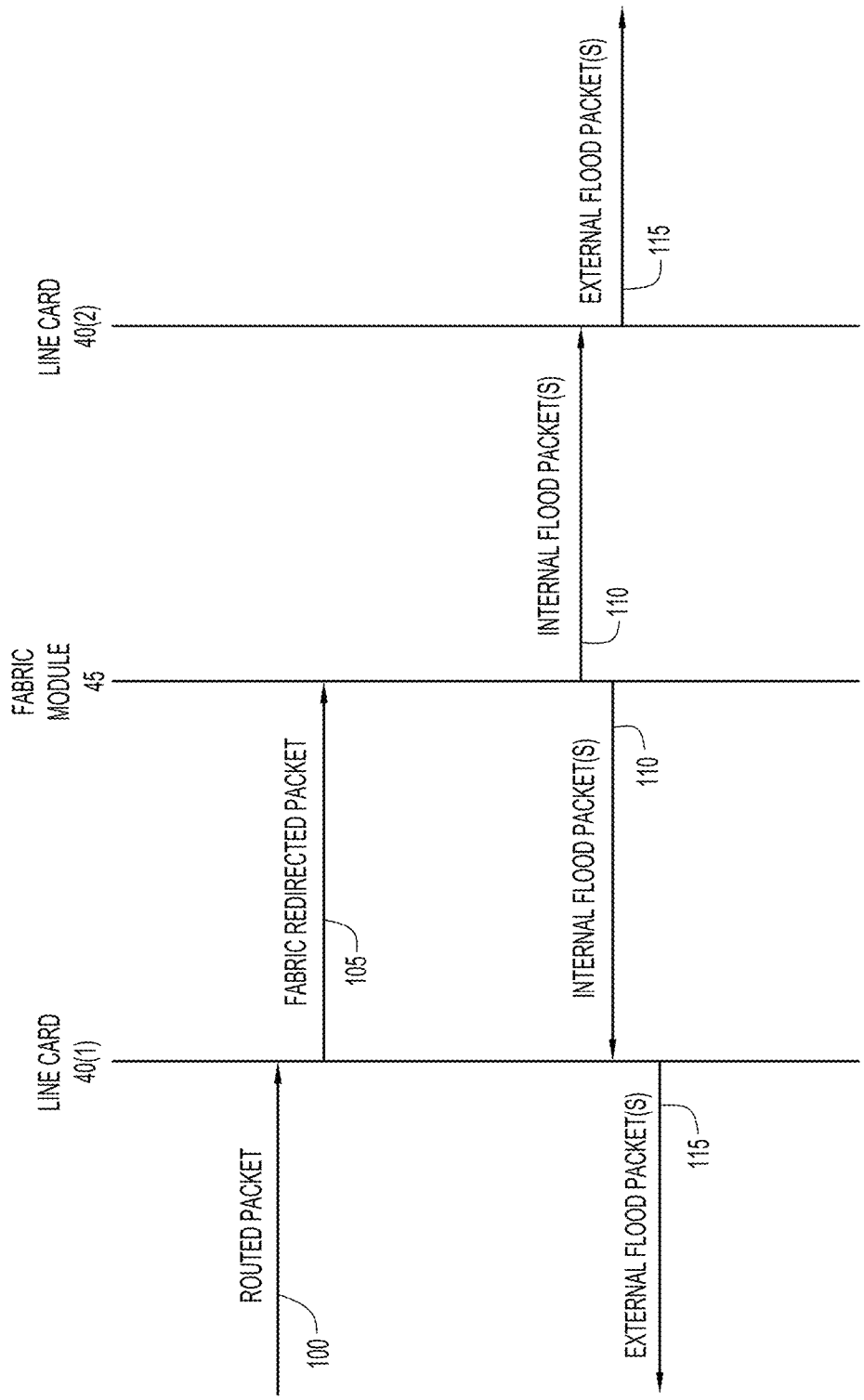
FIG. 3 is a ladder diagram illustrating communications between a fabric module and line cards in accordance with the hierarchical post-routing flood techniques according to an example embodiment.

As described above, the hierarchical post-routing flood techniques presented herein involve both line cards and a fabric module of a networking device. FIG. 3 is a ladder diagram summarizing communications by line cards and a fabric module in accordance with examples presented herein. To facilitate description, the ladder diagram of FIG. 3 is described with reference L3 switch 30 of FIG. 2.

FIG. 3 first illustrates an example in which a routed packet (i.e., an inter-VLAN packet for routing from a first VLAN to a second VLAN), which is represented in FIG. 3 by arrow 100, is received at line card 40(1). As described elsewhere herein, the line card 40(1) determines that a host route installed in the first line card 40(1) for the route packet is associated with a steering adjacency. As such, the line card 40(1) redirects the routed packet to the fabric module 45 as a fabric redirected packet, which is represented in FIG. 3 by arrow 105.

The fabric module 45 performs an L2 lookup on the fabric redirected packet that results in a lookup table miss. As such, the fabric module 45 sends internal flood packet(s), which are represented in FIG. 3 by arrows 110, to the line cards 40(1)/40(2). Upon receipt and processing of the internal flood packet(s), the line cards 40(1)/40(2) send external flood packet(s), which are represented in FIG. 3 by arrows 115, on one or more external ports.

As noted above, network load balancer deployments represent a specific arrangement that utilizes an L2-to-L3-to-L2 lookup sequence. In a network load balancer deployment, when a networking device initiates an Address Resolution Protocol (ARP) request to the virtual IP of the load balancer, the load balancer responds back with the virtual MAC address in the ARP payload. An ARP module of the networking device populates the ARP database with the Virtual IP (e.g., VIP A) and virtual MAC (e.g., VMAC A).

When the load balancer sources a data packet towards the networking device, the load balancer uses the physical network interface card (NIC) MAC (e.g., PHY MAC A) as the source MAC on the L2 header. A networking device connected to an active/standby load balancer does not learn the association between the VMAC A and the underlying Layer 2 port. As such, the virtual IP remains unresolved as the underlying physical port is not known. In general, the networking device is expected to flood the packet in such scenarios. In an ASIC (line card) which supports an L2-to-L3-to-L2 sequence, this flooding occurs naturally. That is, the L2 lookup post-routing would result in flood behavior as the VMAC A is not present in the L2 forwarding table. However, in ASICs capable of performing only an L2-to-L3 sequence, the post-routing L2 lookup is lost and the flooding does not occur naturally. Software currently programs such unresolved routes to drop the adjacency in the hardware routing table, thereby eliminating the ability to use network load balancer deployments. In accordance with the techniques presented herein, networking devices having line cards capable of using only an L2-to-L3 sequence are configured to use hierarchical/hybrid lookups spanning the line cards and the fabric module to enable the use of such a network load balancer deployment. In particular, routes are programmed on the line cards to perform routing/rewrite (i.e., routed packet will have a new L2 header with MAC=VMAC A/VLAN=outgoing VLAN X). The post-routed (i.e., rewritten) packet is redirected/steered to the fabric module to force a full pipeline lookup. On the fabric module, the rewritten packet undergoes an L2 lookup for DMAC=VMAC A resulting in flooding to all the line cards of the networking device. The packets from the fabric module (internal flood packets) come back to line cards and undergo full pipeline lookup resulting in a L2 lookup on the line card. That is, the line cards perform L2 lookups on the post-routed VLAN resulting in a flood on the external ports of the line card.

Figure 4:
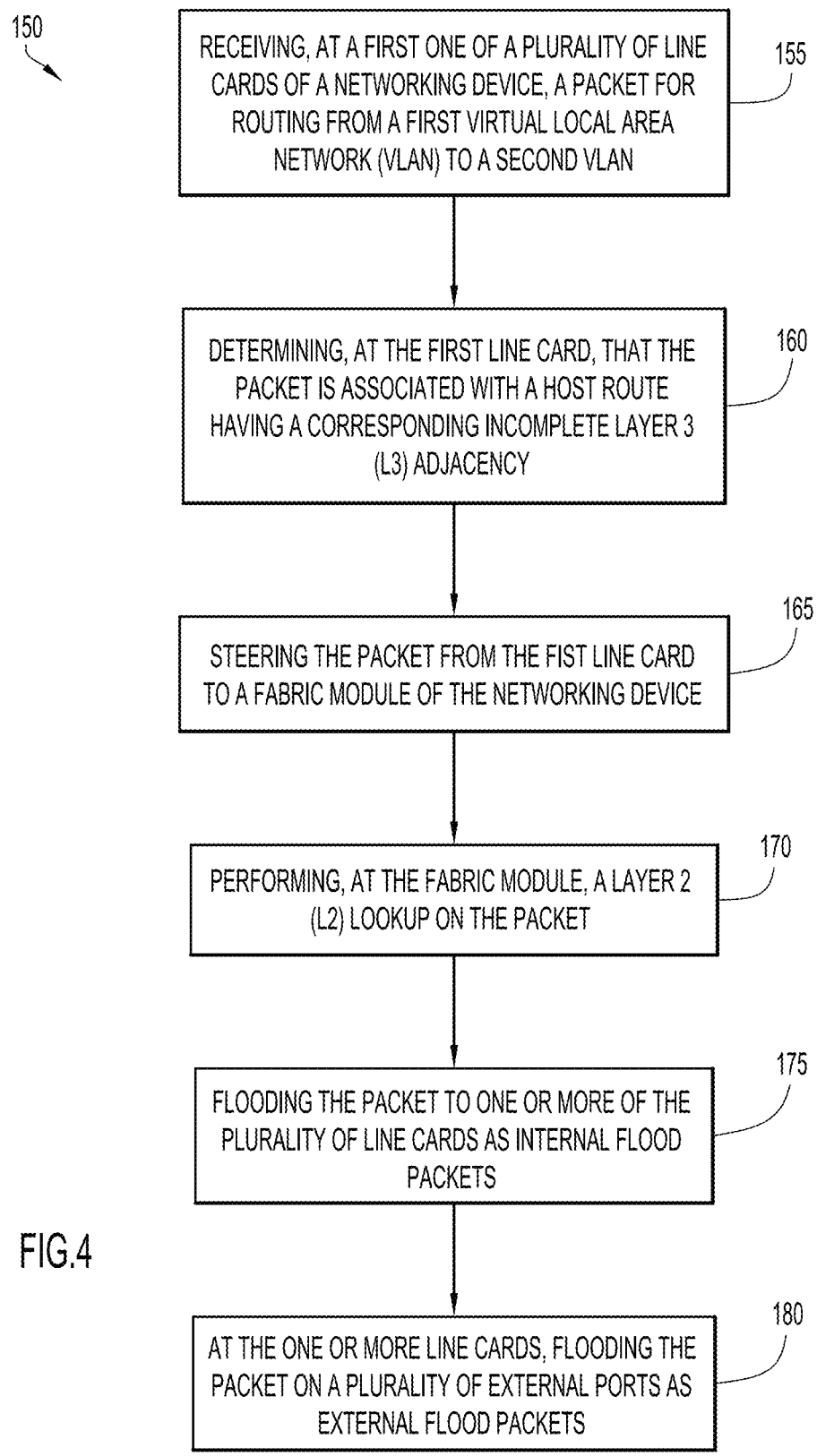
FIG. 4 is a flowchart of a method in accordance with the hierarchical post-routing flood techniques, according to an example embodiment.

FIG. 4 is a flowchart of a method 150 in accordance with examples presented herein. Method 150 begins at 155 where a first one of a plurality of line cards of a networking device receives a packet for routing from a first VLAN to a second VLAN. At 160, the first line card determines that the packet is associated with a host route having a corresponding incomplete L3 adjacency and, at 165, steers the packet from the first line card to a fabric module of the networking device. At 170, the fabric module performs an L2 lookup on the packet and, at 175, floods the packet to one or more of the plurality of line cards as internal flood packets. At 180, the one or more line cards flood the packet on a plurality of external ports as external flood packets.

In summary, presented herein are techniques that enable networking devices having line cards that only support an L2-to-L3 lookup sequence to flood packets when the outgoing interface/exit port is not known, thereby replicating the L2-to-L3-to-L2 lookup sequence provided at other line cards. The fabric module replicates the second L2 lookup to achieve this functionality. As such, the techniques presented herein solve the requirement of L2 flooding in post-routed VLANs when the destination MAC to outgoing interface binding is not known, and thus avoids the need for network re-engineering to meet L2 flooding requirements. The techniques presented herein improve the L2 traffic convergence on network topology changes, which otherwise requires MAC address to outgoing interface resolution before traffic is forwarded. It also addresses flooding requirement for some of the Layer 7 (L7) applications, such as a network load balancer application that relies on Layer 2 flooding to distribute requests.

In one form, a method is provided comprising: receiving, at a first one of a plurality of line cards of a networking device, a packet for routing from a first virtual local area network (VLAN) to a second VLAN; determining, at the first line card, that the packet is associated with a host route having a corresponding incomplete Layer 3 (L3) adjacency; steering the packet from the first line card to a fabric module of the networking device; performing, at the fabric module, a Layer 2 (L2) lookup on the packet; flooding the packet to one or more of the plurality of line cards as internal flood packets; and at the one or more line cards, flooding the packet on a plurality of external ports as external flood packets.

In another form, an apparatus is provided comprising: a first line card and a fabric module. The first line card is configured to: receive a packet for routing from a first virtual local area network (VLAN) to a second VLAN, determine that the packet is associated with a host route having a corresponding incomplete Layer 3 (L3) adjacency, and steer the packet from the first line card to the fabric module. The fabric module is configured to: perform a Layer 2 (L2) lookup on the packet, flood the packet to a plurality of line cards as internal flood packets, wherein the plurality of line cards are configured to flood the packet on a plurality of external ports as external flood packets.

In still other form, an apparatus is provided comprising: a plurality of external ports, wherein at least one of the plurality of external ports is configured to receive a packet for routing from a first virtual local area network (VLAN) to a second VLAN; one or more hardware logic elements configured to: determine that the packet is associated with a host route having a corresponding incomplete Layer 3 (L3) adjacency, steer the packet to a fabric module to that performs a Layer 2 (L2) lookup on the packet, and flood the packet on one or more of the plurality of the external ports as external flood packets.

The above description is intended by way of example only.

What is claimed is:

1. A method comprising:
receiving, at a first one of a plurality of line cards of a networking device, a packet for routing from a first virtual local area network (VLAN) to a second VLAN;
determining, at the first line card, that the packet is associated with a host route having a corresponding incomplete Layer 3 (L3) adjacency involving a Layer 2 (L2)-L3-L2 lookup sequence for forwarding of the packet;
performing an L2-L3 lookup sequence for the packet at the first line card;
after the L2-L3 lookup sequence, steering the packet from the first line card to a fabric module of the networking device;
performing, at the fabric module, an additional L2 lookup on the packet to complete the L2-L3-L2 lookup sequence for the packet;
flooding the packet to one or more of the plurality of line cards as internal flood packets; and
at the one or more line cards, flooding the packet on a plurality of external ports as external flood packets.

2. The method of claim 1, further comprising:
performing the additional L2 lookup at the fabric module in a manner that results in a failure of the additional L2 lookup to find a destination address associated with the packet; and
flooding the packet to the one or more line cards in response to the inability of the additional L2 lookup at the fabric module to find the destination address associated with the packet.

3. The method of claim 2, further comprising:
configuring the fabric module to ensure a failure of the additional L2 lookup to find a destination address associated with the packet by disabling learning of destination addresses by the fabric module for a VLAN associated with the packet.

4. The method of claim 1, wherein the incomplete L3 adjacency associated with the host route is missing an exit port for the host route, and further comprising:
replacing the missing exit port in the L3 adjacency with a fabric module identifier configured to redirect packets associated with the host route to the fabric module.

5. The method of claim 1, further comprising:
adding a hierarchical lookup identifier to the packet before steering to the fabric module, wherein the hierarchical lookup identifier is configured to trigger the additional L2 lookup on the packet at the fabric module.

6. The method of claim 1, wherein flooding the packet to the plurality of line cards comprises:

detecting a failure to find a destination address associated with the packet;
directing the packet to a pre-programmed Internet Protocol (IP) multicast group (IPMG) that initiates replication of the packet to the plurality of line cards.

7. The method of claim 6, further comprising:
adding an IPMG index value to a header of the internal flood packets; and
at the plurality of line cards, using the IPMG index value to determine external ports for use in sending the external flood packets.

8. The method of claim 1, further comprising:
performing, at the one or more line cards, an egress VLAN membership check to limit the sending of external flood packets to only external ports associated with the second VLAN.

9. The method of claim 1, further comprising:
adding a routed marker to the header of the internal flood packets, wherein the routed marker indicates to the one or more line cards that the internal flood packets are routed packets.

10. An apparatus comprising:
a first line card and a fabric module;
the first line card configured to:
receive a packet for routing from a first virtual local area network (VLAN) to a second VLAN,
determine that the packet is associated with a host route having a corresponding incomplete Layer 3 (L3) adjacency involving a Layer 2 (L2)-L3-L2 lookup sequence for forwarding of the packet,
perform an L2-L3 lookup sequence for the packet at the first line card;
after the L2-L3 lookup sequence, steer the packet from the first line card to the fabric module;
the fabric module configured to:
perform an additional L2 lookup on the packet to complete the L2-L3-L2 lookup sequence for the packet, and
flood the packet to a plurality of line cards as internal flood packets;
wherein the plurality of line cards are configured to flood the packet on a plurality of external ports as external flood packets.

11. The apparatus of claim 10, wherein the fabric module is configured to:
perform the additional L2 lookup in a manner that results in a failure of the additional L2 lookup to find a destination address associated with the packet; and
flood the packet to the plurality of line cards in response to the inability of the additional L2 lookup at the fabric module to find the destination address associated with the packet.

12. The apparatus of claim 11, wherein the fabric module is configured to ensure a failure of the additional L2 lookup to find a destination address associated with the packet by disabling the learning of destination addresses by the fabric module for a VLAN associated with the packet.

13. The apparatus of claim 10, wherein the incomplete L3 adjacency associated with the host route is missing an exit port for the host route, and wherein the first line card is configured to replace the missing exit port in the L3 adjacency with a fabric module identifier configured to redirect packets associated with the host route to the fabric module.

14. The apparatus of claim 10, wherein the first line card is configured to add a hierarchical lookup identifier to the packet before steering to the fabric module, wherein the hierarchical lookup identifier is configured to trigger the additional L2 lookup on the packet at the fabric module.

15. The apparatus of claim 10, wherein to flood the packet to the plurality of line cards, the fabric module is configured to:
detect a failure to find a destination address associated with the packet; and
direct the packet to a pre-programmed Internet Protocol (IP) multicast group (IPMG) that initiates replication of the packet to the plurality of line cards.

16. An apparatus comprising:
a plurality of external ports, wherein at least one of the plurality of external ports is configured to receive a packet for routing from a first virtual local area network (VLAN) to a second VLAN;
a fabric module; and
a first line card configured to:
determine that the packet is associated with a host route having a corresponding incomplete Layer 3 (L3) adjacency involving a Layer 2 (L2)-L3-L2 lookup sequence for forwarding of the packet,
perform an L2-L3 lookup sequence for the packet at the first line card;
after the L2-L3 lookup sequence, steer the packet to the fabric module;
wherein the fabric module is configured to:
perform an additional L2 lookup on the packet to complete the L2-L3-L2 lookup sequence for the packet, and
flood the packet on one or more of the plurality of the external ports as external flood packets.

17. The apparatus of claim 16, wherein the fabric module is configured to perform the additional L2 lookup in a manner that results in a failure of the additional L2 lookup to find a destination address associated with the packet.

18. The apparatus of claim 16, wherein the incomplete L3 adjacency associated with the host route is missing an exit port for the host route, and wherein the first line card is configured to:
replace the missing exit port in the L3 adjacency with a fabric module identifier configured to redirect packets associated with the host route to the fabric module.

19. The apparatus of claim 16, wherein the first line card is configured to add a hierarchical lookup identifier to the packet before steering to the fabric module, wherein the hierarchical lookup identifier is configured to trigger processing of the packet at the fabric module.

20. The apparatus of claim 16, wherein the first line card is configured to:
perform an egress VLAN membership check to limit the sending of external flood packets to only external ports associated with the second VLAN.

* * * * *